(12) United States Patent
Alexandrov

(10) Patent No.: US 8,131,052 B2
(45) Date of Patent: Mar. 6, 2012

(54) METHOD OF PROCESSING AN IMAGE

(75) Inventor: Yuriy Alexandrov, Cardiff (GB)

(73) Assignee: GE Healthcare UK Limited, Little Chalfont (GB)

( * ) Notice: Subject to any disclaimer, the term of this patent is extended or adjusted under 35 U.S.C. 154(b) by 974 days.

(21) Appl. No.: 12/090,508

(22) PCT Filed: Oct. 18, 2006

(86) PCT No.: PCT/GB2006/003890
§ 371 (c)(1),
(2), (4) Date: May 6, 2008

(87) PCT Pub. No.: WO2007/045878
PCT Pub. Date: Apr. 26, 2007

(65) Prior Publication Data
US 2008/0253642 A1 Oct. 16, 2008

(30) Foreign Application Priority Data
Oct. 20, 2005 (GB) .................................. 0521301.2

(51) Int. Cl.
*G06K 9/00* (2006.01)
(52) U.S. Cl. ........................................ 382/133; 382/134
(58) Field of Classification Search .................. 382/133, 382/134, 190, 199, 260, 273
See application file for complete search history.

(56) References Cited

U.S. PATENT DOCUMENTS

| | | | |
|---|---|---|---|
| 5,774,572 A | 6/1998 | Caspi | |
| 6,345,115 B1 | 2/2002 | Ramm et al. | |
| 6,345,235 B1 * | 2/2002 | Edgecombe et al. | 702/27 |
| 6,388,788 B1 | 5/2002 | Harris et al. | |
| 6,400,487 B1 | 6/2002 | Harris et al. | |
| 6,563,653 B2 | 5/2003 | Ramm et al. | |
| 6,661,907 B2 * | 12/2003 | Ho et al. | 382/118 |
| 6,937,776 B2 * | 8/2005 | Li et al. | 382/260 |
| 7,219,038 B2 * | 5/2007 | Tracy et al. | 702/189 |
| 2004/0151356 A1 | 8/2004 | Li et al. | |

FOREIGN PATENT DOCUMENTS

| | | |
|---|---|---|
| FR | 2 744 586 | 8/1997 |
| WO | WO 2005/071595 | 8/2005 |

OTHER PUBLICATIONS

Lindeberg, T., "Edge Detection and Ridge Detection with Automatic Scale Selection", International Journal of Computer Vision, 30(2), 117-154 (1998).
Luo, B, et al., "Corner detection via topographic analysis of vector-potential", Pattern Recognition Letters, 20, 635-650 (1990).

* cited by examiner

Primary Examiner — Louis Arana

(57) ABSTRACT

A method of processing an input image produces an output image emphasizing peak-like structures. The input image comprises input pixels and each input pixel has an intensity characteristic. The output image comprises corresponding output pixels and each output pixel has a value. The method comprises the step of calculating for an input pixel the second derivative of the intensity characteristic in two orthogonal directions, one of the directions being the direction of maximum curvature. The product of the two second derivatives is calculated and the value of the output pixel corresponding to the input pixel is determined in dependence on the product.

9 Claims, 3 Drawing Sheets

METHOD OF PROCESSING AN IMAGE

CROSS-REFERENCE TO RELATED APPLICATIONS

This application is a filing under 35 U.S.C. §371 and claims priority to international patent application number PCT/GB2006/003890 filed Oct. 18, 2006, published on Apr. 26, 2007, as WO 2007/045878, which claims priority to Great Britain patent application number 0521301.2 filed Oct. 20, 2005.

FIELD OF THE INVENTION

The invention relates to a method of processing an input image to produce an output image emphasising peak-like structures. The invention further relates to a computer programme performing the method, a data carrier comprising the computer programme and a system arranged to run the computer programme.

BACKGROUND OF THE INVENTION

The processing of images is of particular relevance in the field of biology, where images of biological samples are to be analysed for the presence of certain features. The features may include intracellular components, fibres, granules. When using fluorescent microscopy, the distribution of single molecules labelled with a fluorophore can be imaged.

Biological images are generally processed using a segmentation method. Image segmentation is a form of image processing that distinguishes objects from their background in order to identify structures of interest. Image segmentation may be performed on the basis of characteristic object size and/or object shape. The size range may be known or modelled. For example, if the size of nuclei in a cell sample is within a known range, segmentation may be performed to identify features having the size of the nuclei. Other cellular objects of characteristic size include organelles such as mitochondria, cytoplasmic granules and vesicles within endo- and exocytic pathways. Segmentation on the basis of size may also be performed in order to detect whole cells or structures within cells.

Cell images are generally processed using the so-called top-hat based segmentation. Top-hat transforms are used to segment objects of a pre-defined size. Top-hat transforms run fast, provide good sensitivity to local details and have been proven useful for different fluorescent assays applications. A top-hat is, however, not selective to the shape of the local intensity landscape of an image. A top-hat is roughly equally sensitive to peak-like, ridge-like and edge-like structures having the cross-section for which the top-hat is optimized. This mixed sensitivity to different morphologies is the major source of under-detections, artifacts and false-positives in the analyses of granularity and fibre detection.

It is an object of the invention to provide a method for processing images having shape selectivity to peak-like structures.

SUMMARY OF THE INVENTION

The object of the invention is achieved when a method of processing an input image to produce an output image emphasising peak-like structures, the input image comprising input pixels and each input pixel having an intensity characteristic, the output image comprising corresponding output pixels and each output pixel having a value, wherein the method comprises the step of calculating for an input pixel the second derivative of the intensity characteristic in two orthogonal directions, one of the directions being the direction of maximum curvature, calculating the product of the two second derivatives, and determining the value of the output pixel corresponding to the input pixel in dependence on the product. The input image may be a grey-scale image. The intensity characteristic is a parameter related to the intensity of an image. It may be related e.g. to colour in the image, such as the hue or colour saturation or to intensity in a colour or grey-scale image. The method appears to be exceptionally shape selective and emphasises peak-like structures with hardly any perceptible mixed sensitivity.

It should be noted that the article 'Edge detection and ridge detection with automatic scale selection' by T. Lindeberg in International Journal of Computer Vision, 1998, volume 30(2), pages 117 to 154 discloses a method for emphasising edges and ridges in biological images. It calculates the second derivative in two orthogonal directions, one of the directions being the direction of maximum curvature. The method selects input pixels where one second derivative is large and negative and the other second derivative is small. The absolute value of the large second derivative is used as a measure of the ridge strength. Despite the high sensitivity of this method to ridges, it is also sensitive to peaks. The article does not disclose methods emphasising peaks.

The method according to the invention is preferably characterized in that the value of the output pixel depends on the square root of the product. The square root retains approximately the range of the intensity characteristic of the input image.

The peaks are more clearly brought out in the output image when the value of the output pixel depends on the product of the two derivatives if both second derivatives have a negative value and the value of the output pixel is a constant elsewhere. The constant is preferably zero.

The noise in the output image will be reduced if the second derivatives are calculated as second Gaussian derivatives. The Gaussian derivative retains the range of the intensity characteristic in the input image. The Gaussian derivative is preferably calculated over an area having a size s. The value of s determines the degree of smoothing of features in the input image. Therefore, it also determines the size of the features for which the method is selective.

The two orthogonal directions in which the second derivatives are determined are preferably the directions of the eigenvectors of the Hessian matrix of the intensity characteristic. When the Hessian matrix is s-parameterized, i.e. when using the s-sized second Gaussian derivatives, the reduced noise provides an improved accuracy of the calculation of the eigenvectors.

In a special embodiment of the method, the so-called multi-scale technique, the calculation for each input pixel is carried out for a series of values of s, resulting in a series of intermediate values of the output pixel. When only one value of s is used, the method is sensitive to only one size of feature; using a series of values makes the method sensitive to different sizes of feature that may be present in the input image. The value of the output pixel is preferably chosen as the largest value of the series of intermediate values determined for the corresponding input pixel.

The calculation of the second derivatives is preferably preceded by a pre-processing step on the input image to distinguish features in the image from their background. A top-hat transform is a suitable method of image pre-processing that can be implemented very efficiently in a computer programme. The top-hat may include averaging over an s area to reduce noise.

The method according to the invention may include a preprocessing step that precedes the calculation of the second derivatives. This step can be used to prepare the input image for the peak-emphasising process. Advantageously a segmentation algorithm such as a top-hat transform can be used.

The method according to the invention is eminently suitable for processing images representing a biological specimen.

A second aspect of the invention relates to a computer program arranged to perform the method of the invention.

A third aspect of the invention relates to a data carrier in which the computer program is stored.

A fourth aspect of the invention relates to an analyzer system including a processing unit for running the computer program.

Further features and advantages of the invention will become apparent from the following description of preferred embodiments of the invention, given by way of example only, which is made with reference to the accompanying drawings.

The following definitions will be adhered to in this document:

Intensity is the rate of flow of energy through a unit area placed perpendicular to the direction of propagation. Intensity is understood as the local (coordinate-dependent) measure of energy flow. In a stored representation of an image the intensity is a measure of the brightness of a pixel of the image; for example, a dark area of an image (for example, a un-illuminated background, or a dense, non-fluorescent cytoplasmic region) has a low intensity, while a lighter area (for example, a region marked with a strong fluorophore) has a high intensity.

Pixel (abbr. "Picture element") is the basic unit of a digital image. A pixel has both geometric representation and intensity characteristic. The geometric representation of a pixel is the regular quadrangle (square) centred at X, Y in the Cartesian coordinate system, where both X and Y have discrete (integer) values, in contrast with the continuous (x,y) values. The intensity characteristic of a pixel is the context-dependent number defined by the local sensor associated with the coordinates X,Y. The intensity characteristic is assigned to a pixel during the process of image acquisition. The intensity characteristic may be the radiation intensity, locally measured by a photon detector.

Digital image (also referred as "image") is a rectangular array (grid, lattice) composed of W×H (Width×Height) pixels. The digital image U(X,Y) provides a piecewise-rectilinear representation of the two-dimensional field of interest F(x,y) in the rectangular domain {0<x<W, 0<y<H}. A mathematical transform relating F(x,y) and U(X,Y) is called F→U sampling. Since the image is merely a set of pixels, the terms "geometric representation" and "intensity characteristic" are unambiguously applicable to the image.

Pixel intensity, also referred as "image intensity at X,Y" or simply U(X,Y), is the intensity of a pixel at coordinates X,Y in a digital image U.

Image acquisition is the hardware process implementing F→U sampling and resulting in the creation of a digital image U. Image acquisition defines both geometric representations and intensity characteristics of all pixels in the image U.

Image transform T is defined by the rule R=T[U,.] defining for the given input image U (and some additional data) the calculation of the output image R, having the same geometrical representation as the input image U, but different intensity characteristic R(X,Y) calculated on the basis of U(X,Y).

Binary image transform is an image transform depending on a pair of input images $U_1(X,Y)$ and $U_2(X,Y)$ with the same geometrical representation and pixel intensities given by the formula $R(X,Y)=T[U_1(X,Y),U_2(X,Y)]$.

Examples of image arithmetic, e.g. addition $R(X,Y)=U_1(X,Y)+U_2(X,Y)$ or $R(X,Y)=U_1(X,Y)+a$ (where $a$ is the number)

image maximum, $R(X,Y)=\max[U_1(X,Y), U_2(X,Y)]$.

Function image transform is an image transform defined by the formula R(X,Y)=f[U(X,Y)], where f is an algebraic, elementary or any other function, usually defined on the set of real numbers.

Example: Logarithm of a Grey-Scale Image R(X,Y)=log [U(X,Y)]

Pixel-wise image operation is an image transform that can be expressed as a combination of one or more binary and/or function image transforms.

Image convolution with the mask image B is an image transform R=T[U,B], also denoted as R=U⊗B, and given by the formula $$R(X, Y) \equiv [U \otimes B](X, Y) = \sum_{i=-D_W}^{D_W} \sum_{j=-D_H}^{D_H} U(X+i, Y+j) \cdot B(i, j),$$

where $D_W$ and $D_H$ are the half-width and the half-height of the mask image B, respectively.

The width and the height of the mask B must be both uneven and equal $W_B=2D_W+1$ and $H_B=2D_H+1$, respectively.

Box averaging of the size (scale) s is a normalized convolution of the image with the square 1 Box image of the size s ($W_B=H_B=s$).

The intensity characteristic of 1 Box image is defined as

∀i,j such as (0<i<s, 0<j<s), 1 Box(i,j)=1.

Formally, the box averaging transform is defined as $$<U>_{s,1Box} = \frac{1}{s^2} U \otimes (1\,\text{Box})$$

Gaussian averaging of the size s is the convolution of an image with a mask image representing the normalized bell-shape (2d-Gaussian) function $G_2(x,y|s)$ of the size s. This averaging is also referred as Gaussian smoothing. It is defined as $<U>_{s,Gauss}=U \otimes G_2(x,y|s)$, where $$G_2(x, y|s) = \frac{1}{2\pi s^2} \exp\left[-\frac{x^2+y^2}{2s^2}\right].$$

Gaussian n-th order derivative operation of the size s is the convolution of an image with a corresponding Gaussian mask, formally defined as $$U_{\underbrace{x\ldots x}_{n},s,Gauss} = U \otimes \frac{\partial^n}{\partial x^n} G_2(x,y|s)$$

and analogously for the y-coordinate. In the following $$U_{\underbrace{x\ldots x}_{n},s,Gauss}$$

is written as $$U_{\underbrace{x\ldots x}_{n},s}$$

for sake of brevity.

Binary image is an image with a binary intensity characteristic (i.e. for which $U(X,Y) \in \{0,1\}$).

Image binarization operation is an image transform where the output image is a binary image. The transform is usually a pixel-wise transform.

Image thresholding is defined as an image binarization operation $$R[U,t] \equiv \text{Threshold}(U,t), \text{ where } R(X,Y) = \begin{cases} 1, & U(X,Y) > t \\ 0, & \text{otherwise} \end{cases}$$

with t the threshold value.

Labelled image is an image with integer intensity characteristic, i.e. for which $U(X,Y) \in Z$. In the labelled image, each intensity value L is associated as a label with a set of pixels satisfying $U(X,Y)=L$, and therefore each label represents a geometric object.

Image labelling is an image transform where the output image is a labelled image.

Image segmentation is an image labelling operation performed in accordance with the given semantic context of a problem. The segmentation operation partitions the image into sets of pixels (labels), also called objects of interest. Also, the background pixels (object of no interest) are usually present. In the majority of image processing applications, the label chosen for the background pixels is $U(X,Y)=0$, the zero background convention.

DETAILED DESCRIPTION OF THE INVENTION

Figure 1:
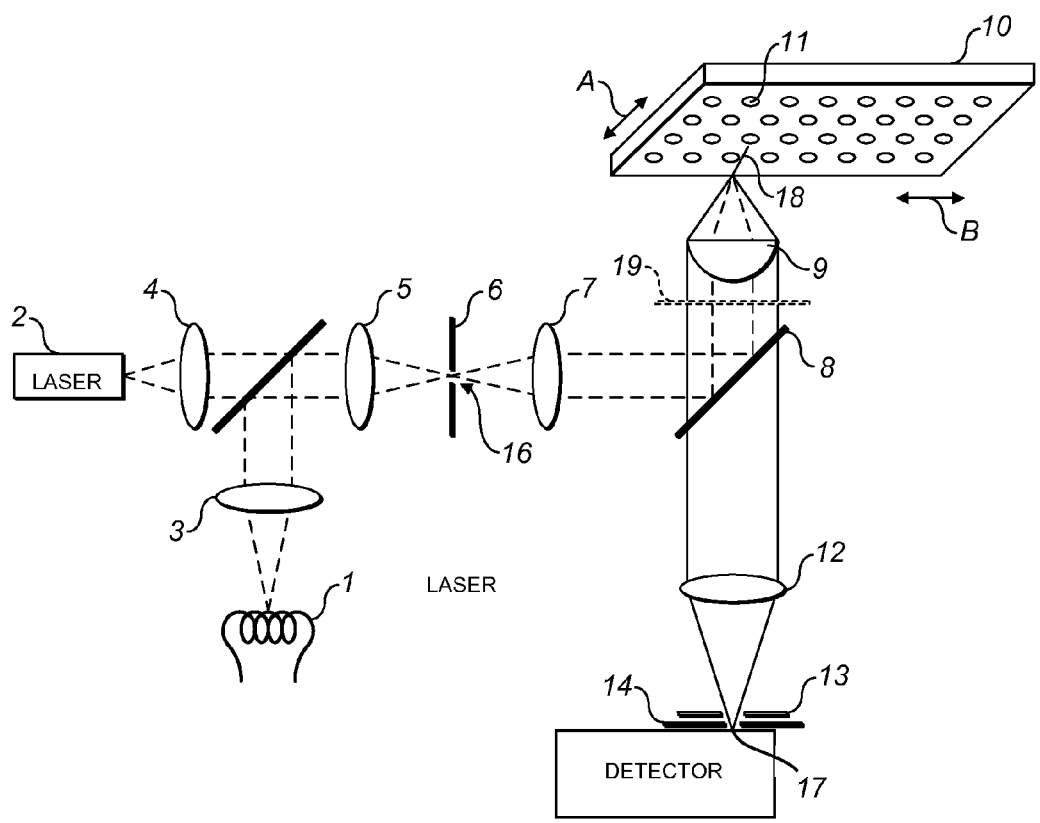
FIG. 1 shows a schematic view of a fluorescence microscope used to image samples.

The input image may be obtained using fluorescent microscopy. Fluorescent microscopy is a versatile and widespread technique in molecular and cellular biology. Fluorescence microscopy is based on the property of some atoms and molecules to absorb light of a certain wavelength and to subsequently re-emit the energy at a longer wavelength. Where a feature of interest is not naturally fluorescent, that feature may be labelled with a fluorophore, which will absorb and re-emit light at certain wavelengths. The fluorophore may be the gene product of a tissue-, cell- or organelle-specific transgene, or it may be added as an exogenous compound to a cell suspension. In contrast to other modes of optical microscopy that are based on macroscopic specimen features, such as phase gradients, light absorption and birefringence, fluorescence microscopy is capable of discriminating a single molecule and imaging its distribution based solely on the properties of fluorescence emission.

Using fluorescence microscopy, the precise location of intracellular components labelled with specific fluorophores can be monitored, as well as their associated diffusion coefficients, transport characteristics and interactions with other biological molecules. In addition, any response in fluorescence to localized environmental variables enables the investigation of pH, viscosity, refractive index, ionic concentrations, membrane potential and solvent polarity in living cells and tissues.

The invention provides a potentially automated, rapid and efficient method for detecting a wide variety of biological structures which are marked with one or more fluorescent markers. Several markers may be used in conjunction. The method can be used in cellular assays conducted on chemical compounds or any molecule of biological interest, including but not limited to drug candidates, such as those found in combinatorial libraries, allowing high throughput screening of chemical compounds of biological interest. The invention is useful for identifying a wide variety of biological structures. A method according to the present invention is also particularly useful for the analysis of nerve cells.

The biological specimen may be marked with any known fluorophore or fluorescent label including but not limited to fluorescein, rhodamine, Texas Red, Amersham Corp. stains CY™3, CY™5, CY™5.5 and CY™7, DRAQ5™, Hoechst's nuclear stains and Coumarin stains. Reference is made to the Handbook of Fluorescent Probes and Research Chemicals by R. P. Haugland, 6th ed., 1996, Molecular Probes, Inc., Eugene, Oreg. for further details of the labels. Alternatively, in assays in which the same cell population is imaged and analysed a number of times during a time course study, a non-toxic nuclear marker may be used. Such a non-toxic marker may be in the form of an NLS-fluorescent protein fusion. For example, the CLONTECH™ pHcRed1-Nuc vector, when transfected into a cell line, produces a red fluorescence signal in the nucleus. Alternatively, a green signal may be produced by the transfection of a vector including the GFP (green fluorescent protein) gene.

FIG. 1 shows a schematic view of a fluorescence microscope which can be used to image the above samples. An example of such a microscope is the Nikon TE2000 microscope, as incorporated into the Amersham Biosciences INCELL™ Analyzer 3000 system, disclosed in U.S. Pat. Nos. 6,400,487 and 6,388,788. The microscope comprises a source of electromagnetic radiation, for example a light bulb 1 and/or a laser 2 emitting radiation in the optical range, 350-750 nm, which is collimated by lenses 3 and 4, respectively. The microscope further comprises a cylindrical lens 5, a first slit mask 6, a first relay lens 7, a beam splitter 8 in the form of a dichroic mirror, an objective lens 9, a microtiter plate 10 containing a two-dimensional array of sample wells 11, a tube lens 12, a filter 13, a second slit mask 14 and a detector 15. These elements are arranged along the optical axis OA defined by slit apertures 16, 17 in masks 6, 14, respectively, and extending perpendicular to the plane of FIG. 1. The focal lengths of lenses 7, 9 and 12 and the spacings between these lenses as well as the spacings between mask 6 and lens 7, between objective lens 9 and microtiter plate 10 and between lens 12 and mask 14 are such as to provide a confocal microscope. However, it will be recognized that a non-confocal microscope can also be used, e.g. as incorporated in the Amersham Biosciences INCELL™ Analyzer 1000 system, disclosed in U.S. Pat. Nos. 6,563,653 and 6,345,115.

In this embodiment, the electromagnetic radiation from the source is focused to a line using the cylindrical lens 5. The shape of the line is optimized by the first slit mask 6. The slit mask 6 is shown in a plane of the optical system that is conjugate to the plane of the microtiter plate 10. The illumination stripe formed by the aperture 16 in the slit mask 6 is relayed by lens 7, dichroic mirror 8 and objective lens 9 onto the microtiter plate 10. For convenience of illustration, the optical elements are depicted in cross-section and the well plate in perspective. The projection of the line of illumination onto well plate 10 is depicted by a line 18. As indicated by arrows A and B, well plate 10 may be moved in two directions (x, y) parallel to the directions of the array by means not shown.

Alternatively, the slit mask 6 may be arranged in a Fourier plane of the optical system, that is in a plane conjugate to the back focal plane (BFP) 19 of the objective lens 9. In this case the slit aperture 16 lies in the plane of the figure, the lens 7 relays the illumination stripe formed by the aperture 6 onto the back focal plane 19 of the objective 9, which transforms it into a line in the plane of the microtiter 10 perpendicular to the plane of FIG. 1.

The radiation from the source may also be focused into the back focal plane 19 of the objective lens 9 without use of the slit mask 6. This can be accomplished by the combination of the cylindrical lens 5 and the spherical lens 7 as shown in FIG. 1, or the illumination can be focused directly into the plane 19 by the cylindrical lens 5.

An image of the sample area, for example a sample present in the sample well 11, is obtained by positioning the microtiter 10 such that the line 18 of illumination is arranged across the sample, imaging the fluorescence emission from the sample onto detector 15 and translating the plate 10 in a direction perpendicular to the line of illumination, synchronously with the reading of the detector 15. The fluorescence emission is collected by the objective lens 9, projected through the beam splitter 8, and imaged by lens 12 through filter 13 and the second slit mask 14 onto the detector 15, such as is appropriate to a confocal imaging system having an infinity-corrected objective lens 9. The beam splitter 8 and filter 13 preferentially block light at the illumination wavelength. The detector 15 may be a camera such as the Roper CoolSnap HQ™, as incorporated into the Amersham Biosciences INCELL™ Analyzer 3000 system. The detector may be either one dimensional or two dimensional. If a one dimensional detector is used, slit mask 14 is not required. The illumination, detection and translation procedures are continued until the prescribed area has been imaged. Mechanical motion of the microtiter is simplified if it is translated at a continuous rate. Continuous motion is most useful if the camera read-time is small compared to the exposure-time. In a preferred embodiment, the camera is read continuously. The displacement d of the sample during the combined exposure-time and read-time may be greater than or less than the width of the illumination line W, exemplarily 0.5W≦d≦5W. All of the wells of a multi-well plate can be imaged in a similar manner.

Figure 2:
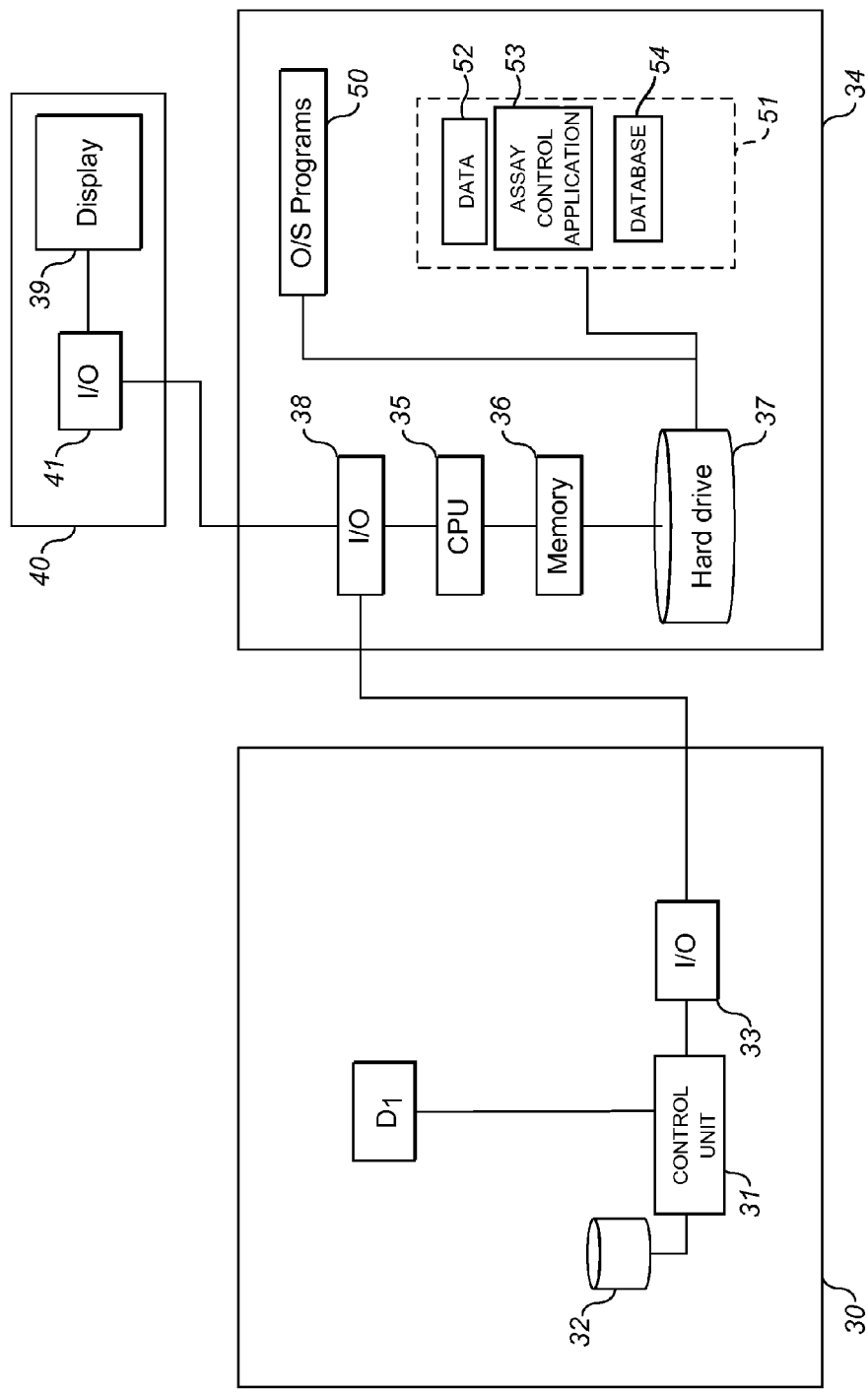
FIG. 2 shows a schematic illustration of data processing components of a system.

FIG. 2 shows a schematic illustration of data processing components of an analyzer system. The system includes a cell analysis system 30, based on the Amersham Biosciences INCELL™ Analyzer system. The cell analysis system 30 includes detector $D_1$, which may be a detector 15 of a microscope as shown in FIG. 1. The cell analysis system 30 further comprises a control unit 31, an image data store 32 and an Input/Output (I/O) device 33.

An associated computer terminal 34 includes a central processing unit (CPU) 35, memory 36, a data storage device such as a hard disc drive 37 and I/O devices 38 which facilitate interconnection of the computer with the cell analysis system 30 and interconnection of the computer with a display element 39 of a screen 40 via a screen I/O device 41, respectively. Operating system programs 50, such as Microsoft Windows XP™, are stored on the hard disc drive 37, and control, in a known manner, low level operation of the computer terminal 34. Program files and data 51 are also stored on the hard disc drive 37, and control, in a known manner, outputs to an operator via associated devices and output data stored on the hard disc drive. The associated devices include the display 39 as an element of the screen 40, a pointing device (not shown) and a keyboard (not shown), which receive input from, and output information to, the operator via further I/O devices (not shown). Included in the program files 51 stored on the hard disc drive 37 are an image processing and analysis application 52, an assay control application 53, and a database 54 for storing image data received from the cell analysis system 30 and output files produced during data processing. The image processing and analysis application 52 includes image processing and analysis software packages. A method according to an embodiment of the invention may be implemented as software within the image processing and analysis application 52.

The performance of a scan using the cell analysis system 30 is controlled using control application 53, and the image data are acquired. In an embodiment, the control application acts in concert with an autofocus system of the microscope shown in FIG. 1. After the end of acquisition of image data for at least one well in a microtiter plate by the detector D1, the image data are transmitted to the computer 34 and stored in the database 54 on the computer terminal hard disc drive 37, at which point the image data can be processed using the image processing and analysis application 52.

Figure 3:
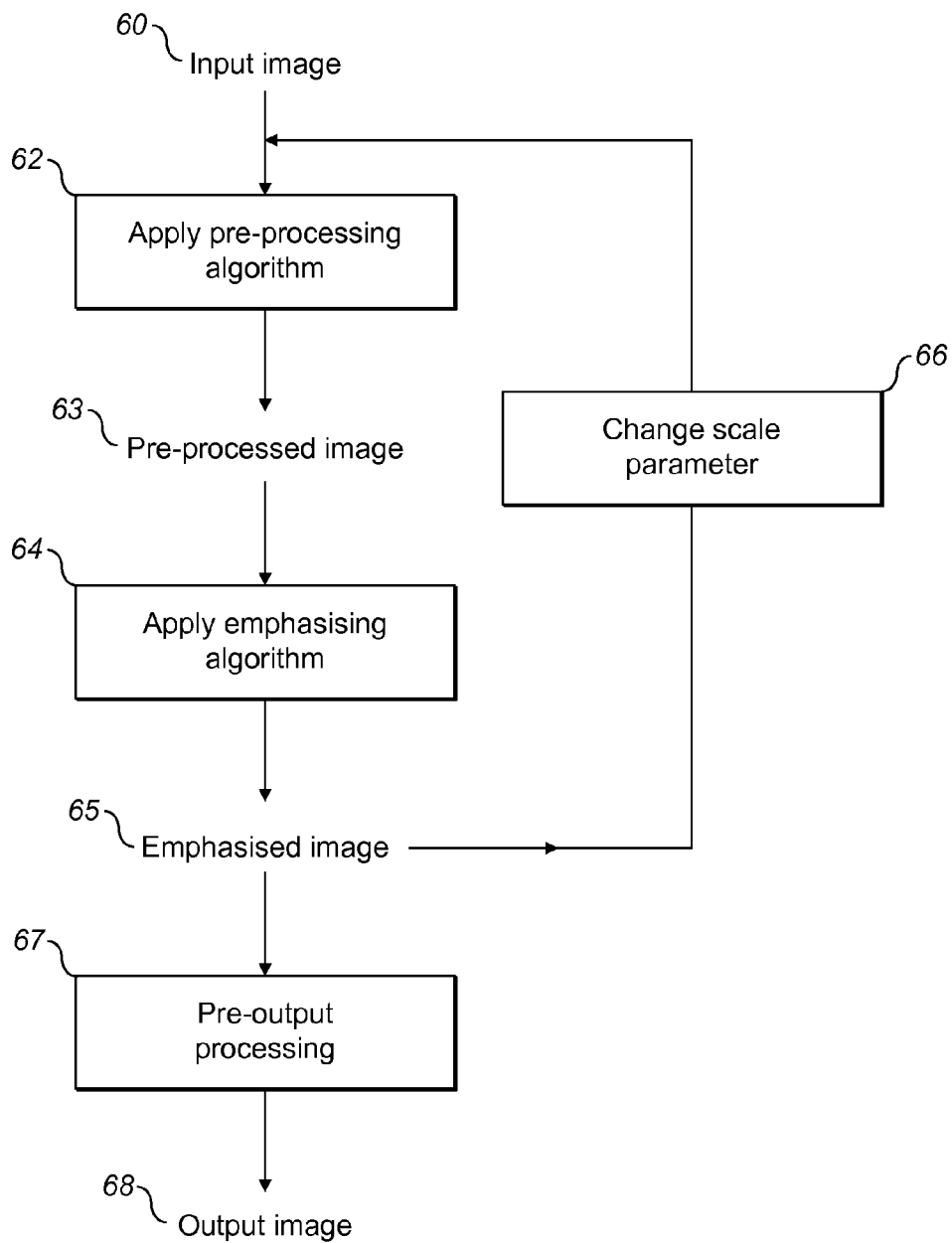
FIG. 3 shows a flow diagram of a method of processing an image according to the invention.

FIG. 3 shows a flow diagram of a method of processing an input image of a biological specimen according to the invention. The input image 60 in this embodiment is a digital image captured by a fluorescence microscope as shown in FIG. 1 and analysed in an analyzer system as shown in FIG. 2. The input image 60 is a grey-scale image made up of pixels, each pixel having an intensity.

At step 62 an optional pre-processing transform is applied to the input image 60. The pre-processing may include a top-hat transform. A non-linear top-hat transform T transforms the intensity value U of the input image to an intensity value R of the output image according to the following algorithm:

$$R = T(U; s \mid k; K) = \frac{U < U >_{ks}}{[< U >_{Ks}]^2} - 1, \text{ where } K > k > 1.$$

The transform is a pixel-wise operation carried out on input pixels of the input image. For each input pixel U(X,Y) the resulting output value is assigned to the corresponding output pixel R(X,Y). <U> is the average of the intensity of the pixels of the input image over an area of size s around the pixel of the input image on which the transform is being applied. The averaging may be of the Gaussian type or box type. The scale parameter s determines the size of the features for which the algorithm is sensitive. The area for averaging may be defined as a square having sides of 2s+1 pixels centred on the pixel on which the transform is being applied. The parameters K and k are tuning coefficients.

The parameters of the transform above can be adjusted for optimal segmentation of regions of interest. It has been shown that the transform above is very effective in segmenting regions of a variety of differing sizes and shapes with the following combination of parameters: k=1.5, K=3, where the value of s is chosen in accordance with the size of the biological objects of interest. Furthermore, the transform will process a 1000×1000 pixel input image and return a segmented image in about 0.2 seconds when run on a desktop PC with a 2 GHz processor.

The non-linear top-hat transform implements a pixel comparison heuristic such that a pixel is identified as being part of a region representing a structure of interest if it is of a first intensity range, and pixels that are close to it are also of the first intensity range, and its far surroundings are of a second, different intensity range. The transform may be carried out such that the area Ks does not include ks or that Ks does include ks, the latter being computationally faster. In a preferred embodiment the first intensity value is higher than the second intensity value, so that pixels representing areas marked with a fluorophore are identified as being in regions representing biological structures of interest.

The pre-processing algorithm provides a size-tuned enhancement of regions representing biological structures of a size corresponding to the scale parameter s, which distinguishes such regions from the background and from noise caused by individual 'spikes' of high intensity. Application of the algorithm to the image results in a pre-processed image 63. In the pre-processed image the biological structures of interest are emphasized in a way most suitable for further processing, for example by making them shading-independent.

The next step in the image processing method is the application of the emphasising algorithm according to the invention on the pre-processed image 63 as input image. The algorithm calculates for pixels of the input image 63 the s-parameterized Hessian matrix H $$H = \begin{vmatrix} U_{xx,s} & U_{xy,s} \\ U_{yx,s} & U_{yy,s} \end{vmatrix}$$

where $U_{ab,s}$ is the s-sized second Gaussian derivative in the directions a and b. For each input pixel U(X,Y) the matrix is calculated and diagonalized by determining the rotation transform C(x,y→p,q) and the corresponding rotation angle $\Phi$ such that the transformed Hessian $\tilde{H}=CHC^{-1}$ is diagonal:

$$\tilde{H} = \begin{vmatrix} U_{pp,s} & 0 \\ 0 & U_{qq,s} \end{vmatrix}, C = \begin{vmatrix} \cos\varphi & \sin\varphi \\ -\sin\varphi & \cos\varphi \end{vmatrix}$$

The diagonalization is reduced to finding the orthogonal eigenvectors of H, which can be carried out using known procedures, as for example disclosed in the article 'Multiscale texture enhancement' by J. Weickert in 'Computer analysis of images and patterns; Lecture notes in computer science', edited by V. Hlavac and R. Sara, Vol. 970 (Springer, Berlin, 1995), pages 230-237. Once the rotation angle $\Phi$ is known, the derivatives $U_{pp,s}$ and $U_{qq,s}$ can be calculated according to the rules:

$$\partial_p = \sin\varphi \cdot \partial_x - \cos\varphi \cdot \partial_y$$

$$\partial_q = \cos\varphi \cdot \partial_x + \sin\varphi \cdot \partial_y$$

The application of the emphasising algorithm to the input image results in an output image. The algorithm assigns a so-called peak strength value to each output pixel according to $$P = \begin{cases} \sqrt{U_{pp,s} \cdot U_{qq,s}} & \text{if } U_{pp,s} < 0 \text{ and } U_{qq,s} < 0 \\ 0 & \text{otherwise} \end{cases}$$

The application of the algorithm forms an output image, being an emphasised image 65, which shows peak-like features commensurate with the value of the scale parameter s. The value of the scale parameters for the pre-processing algorithm and the emphasising algorithm is generally chosen to be equal, but they may have different values. The difference is preferably small.

The process of applying the pre-processing algorithm and the emphasising algorithm may be carried out for a plurality of different values of the scale parameter, allowing the discrimination of features in the input image having a plurality of sizes. Such a multi-scale method is shown in FIG. 3 by the loop including step 66. The multi-scale method starts with a selection of the shape of interest, such as edge, ridge, peak or corner. In the embodiment of the method shown in FIG. 3 the shape of interest is peak, for which the method according to the invention is used. Next, the spectrum of the scales is defined, which will in general depend on the origin of the sample. The spectrum will contain a series of scale parameter values s. For each scale parameter value the processing will pass through a loop indicated by the references 62 to 66. In step 62 the input image will be processed by a pre-processing algorithm sensitive to a broad variety of shapes, such as a linear or non-linear top-hat, with a first value of the scale parameter. The pre-processed image 63 resulting from the pre-processing algorithm is used as input for step 64, which applies a algorithm selective for the chosen shape of interest, such as the peak-sensitive method according to the invention. The shape selective algorithm uses the same value of the scale parameter. The resulting intermediate emphasised image 65 is stored on the hard disc drive 37. In step 66 the value of the scale parameter is changed according to a predetermined scheme of going through the values in the spectrum. The plurality of resulting intermediate emphasised images 65 can be processed to a single, final emphasised image. One method of combining the images is to compare the intermediate images pixel by pixel and assign the highest value of the values of the intensity the pixel has in the plurality of intermediate images to the pixel of the final emphasised image. In another method the value of a pixel in the final emphasised image is the product of the values of the pixel in the intermediate images.

The emphasised image may subsequently be subjected to pre-output processing in step 67. Pre-output processing may comprise a step of intensity-based segmentation. The processing step makes a selection in the image of groups of pixels that have an intensity within a, preferably high, intensity range. Examples of such a method are user-controlled thresholding or automatic thresholding (optimal image bipartition) or intensity-based local or global region growing, or any combination thereof. Thresholding is a method of converting a grey-scale image to a black and white image by transforming pixels having an intensity below a certain intensity threshold into black pixels and pixels having an intensity above the threshold into white pixels. A negative image may be produced by reversing the conversion based on the threshold. Once the image has been converted into a black and white image, the black and white image may be scanned to identify the regions representing biological structures. Pixels within a region may be identified by the 4-connected criteria i.e. that all pixels within the region are in contact either horizontally or vertically. The pre-output processing results in an output image 68.

Other methods of pre-output processing may comprise altering the intensity values of pixels that make up the emphasised image in order to show the regions of interest to a human user more clearly. Intensity values of pixels which have been identified as being within a region representing a biological structure are increased, while all other pixels are reduced in intensity, in order to highlight the regions which represent the biological structures of interest. Alternatively, if the image is a negative, pixels identified as being part of such a region maybe decreased in intensity.

Altering the intensity values of pixels during pre-output processing may further involve averaging pixel intensity values within the regions, or in the background, in order to clearly delineate the regions or suppress noise in the background. Alternatively, noise suppression may take place before application of the algorithms to the image.

Furthermore, pre-output processing may comprise outlining. Outlining consists of applying a thin, visible border to the image to delineate the segmented regions from the background. Although the embodiments of the invention are described with reference to images of biological samples, it is clear that images of other objects may likewise be processed by the method of the invention. The transforms in the above embodiments of the method operate on 2-D input images and output images of the same size. The transforms may likewise operate on images of unequal size. An image may also be a 3-D arrangement of pixels on which the transforms can operate. The above definitions and embodiments are independent of the dimensionality of the image. Whereas the above embodiments are based on grey-scale images, the invention is equally applicable to colour images in which a suitable intensity characteristic has been chosen.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of processing an input image to produce an output image emphasizing peak-like structures, the input image comprising input pixels and each input pixel having an intensity characteristic, the output image comprising corresponding output pixels and each output pixel having a value, wherein the method comprises:
    calculating an input pixel for a second derivative of an intensity characteristic in two orthogonal directions, wherein the two orthogonal directions are the directions of the eigenvectors of the Hessian matrix of the intensity characteristic;
    calculating a product of the two second derivatives; and
    determining a value of the output pixel corresponding to the input pixel in dependence on the product.

2. The method of claim 1, wherein the value of the output pixel depends on a square root of the product.

3. The method of claim 1, wherein the second derivatives are second Gaussian derivatives.

4. The method of claim 1, wherein the Hessian matrix is s-parameterized.

5. The method of claim 4, wherein the calculation for each input pixel is carried out for a series of values of s, resulting in a series of intermediate values of the output pixel.

6. The method of claim 5, wherein the value of the output pixel is a large value of the series of intermediate values.

7. The method of claim 1, wherein a pre-processing step precedes the calculation of the second derivatives.

8. The method of claim 7, wherein the pre-processing step is a top-hat transform.

9. The method of claim 1, wherein the image represents a biological specimen.

* * * * *